D. T. PERKINS.
Water-Gate.
No. 196,474. Patented Oct. 23, 1877.
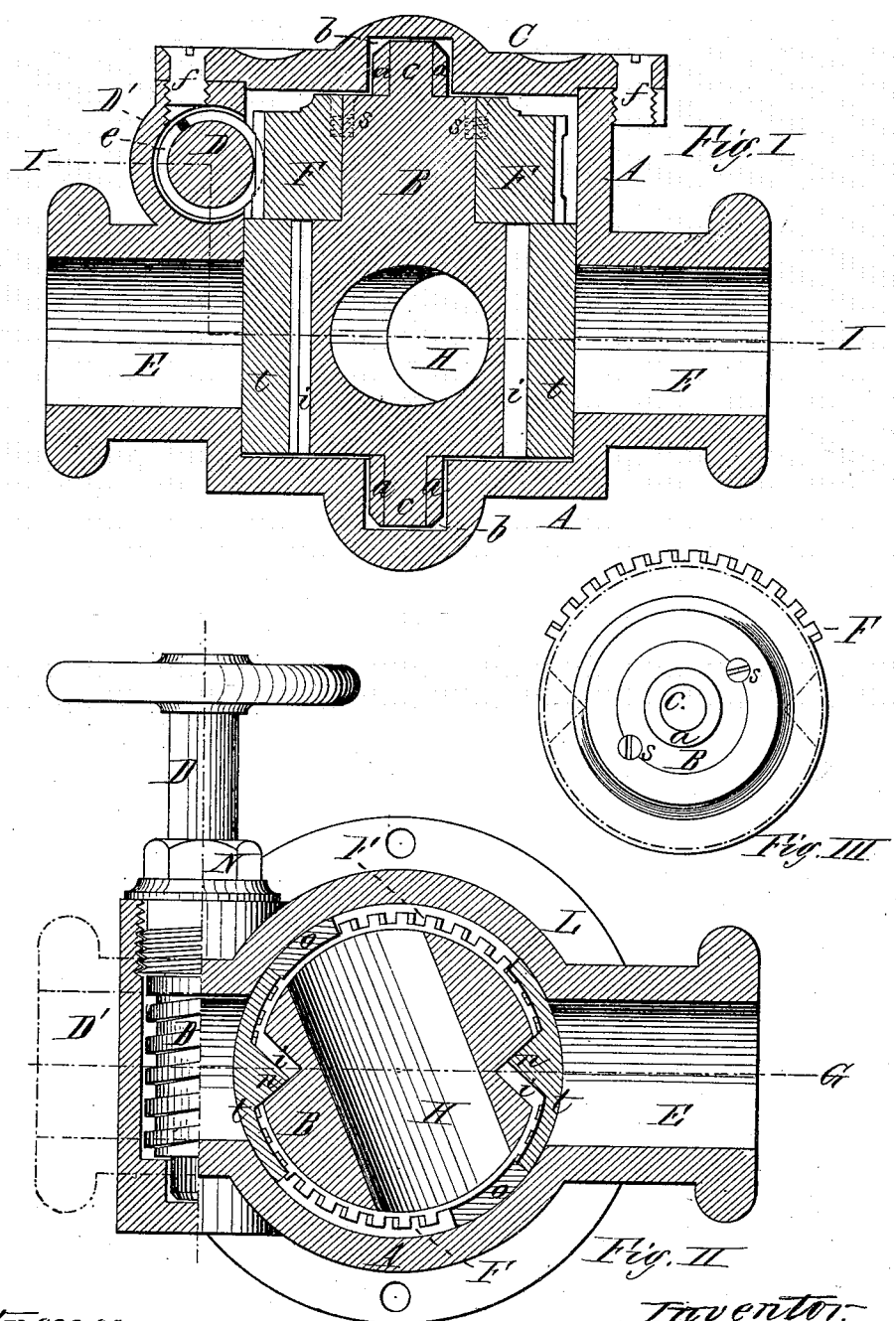

UNITED STATES PATENT OFFICE.

DUANE T. PERKINS, OF SPRINGFIELD, MASSACHUSETTS.

IMPROVEMENT IN WATER-GATES.

Specification forming part of Letters Patent No. 196,474, dated October 23, 1877; application filed March 12, 1877.

*To all whom it may concern:*

Be it known that I, DUANE T. PERKINS, of Springfield, in the State of Massachusetts, have invented a new and useful Water-Gate; and that the following is a full, clear, and exact description thereof, reference being had to the accompanying drawings, making a part of this specification, and to the letters of reference marked thereon.

The object of my invention is to provide a pipe with a valve or gate which may be easily operated, tightly closed, and, when open, will furnish a water-passage through it of the full size of the pipe, and which will be kept free from sediment by the flow of water through it.

To this end my invention consists of a perforated cylindrical plug placed across the pipe or water-passage, and operating upon trunnions within a shell or chamber, and provided with peripheral valves with internal projections operating in grooves in the plug, the shell being provided with stops, against which the valves strike when the passage is closed by the valves. The plug is provided with a gear, which engages with a worm or threaded spindle to operate the plug in opening and closing the valves, all which will be more fully hereinafter described.

Figure I is a horizontal sectional view of my invention through the center of the plug and its chamber. Fig. II is a vertical section at line I of Fig. I, and Fig. III is an end view of the plug with the gear secured thereon.

In the drawings, E represents the passage connecting with the pipe, and A the shell, which is of cylindrical form, and contains the plug B, which, of itself, is considerably less in its diameter than the diameter of the shell inside, and the plug B turns freely upon its trunnions $c$ in their bearings or recesses $b$, one in each end of the shell; and these trunnions may each be provided with a collar, $a$, made of composition or brass, to prevent oxidation, and a thin plate of similar metal may be placed between the end of the plug and the shell for a similar purpose, and to cause the plug to work easily.

The plug B is provided with a horizontal groove, $i$, on each side, one opposite the other, as shown in Fig. II; and a valve, $t$, somewhat thinner than the space between the periphery of the plug and the interior surface of the shell, and provided with an interior projection, $n$, is placed, with the said projection, in the groove $i$, as shown in Fig. II.

The exterior or convex side of each valve $t$ is made to fit the interior cylindrical form of the shell A, and the latter is provided with two stops, $o$, one opposite the other.

The plug B is provided with a worm-gear, F, at one end, which may be secured to the plug by means of keys or screws $s$, or by any other convenient means; and a worm or threaded spindle, D, operating in its case $D'$, and packed by the ordinary packing-nut N, engages with the teeth of the gear F, and serves to turn the plug in either direction.

One end of the shell A is made open, and a cover or head, C, with the trunnion-recess $b$ made therein, is secured to the open end of the shell, or to the flange L, by suitable bolts or screws $f$.

The worm-gear may extend around the entire perimeter of the plug, as shown in Fig. II, or it may extend only a portion of the way, as shown in Fig. III, and the hole H through the plug B should be of the full size of the interior diameter of the pipe or passage E.

The operation of my invention is as follows: If the plug B is in the position shown in Fig. II, the worm-spindle D is turned in one direction, and the plug rotated until the hole H is in line with the passage E, which may be determined by one edge of the valves $t$ striking against the stops $o$ on the inside of the shell A, and the gate is then open, and a straight and uninterrupted passage is provided for the water to flow through.

To close the gate, the worm-spindle and plug are rotated in the opposite direction (the valves $t$ meanwhile being quite loose in the shell, and moving freely therein) until the plug is in a position with the hole H transverse to the passage E, as shown in Figs. I and II. As the valves $t$ close the orifice of the pipe E on each side, their edges strike against the stops $o$, which prevents the valves from moving around any farther, and the force applied in turning the plug brings one of the inclined sides of each groove $i$ against the corresponding inclined side of the projection $n$ on the valve $t$, and this forces the valve outward against its seat to close the orifice.

That part of the shell A inside, immediately around the pipe E or its orifice, may be provided with a composition-metal seat, and project into the shell slightly, to form a perfect seat, if desired, and also to prevent oxidation at that point; and when so made the stops $o$ may be so arranged that the valves will not at any time be moved entirely off their seats.

It is evident that as the valves are in the form of curved plates, and considerably less in thickness than the space between the plug and its shell, they are perfectly loose and free when the plug is being rotated, and move freely in the shell, being carried around by the projections $n$ in the grooves $i$, and are only forced outward against the inside of the shell, or against their seats, when their rotary movement is stopped by the stops $o$.

If any sticks should pass into the hole H while the valves are being closed, they will be cut off, and if one part should remain in the hole while the gate remains closed, no inconvenience will result, as it will be carried out, as would also any other foreign matter, by the flow of water through the hole as soon as the gate is opened again.

It is evident that any other means of operating or rotating the plug may be used without changing the nature or character of the gate. For example, instead of the gear F and the stationary worm-spindle D, an arm might be attached to or connected with the plug, and a threaded spindle moving in and out attached to the arm, which would operate the plug and its valves in precisely the same manner.

It is obvious that, instead of the trunnions being made upon the plug, they may be made on the inside of the shell at each end, and the recesses $b$ may be made in each end of the plug; but, inasmuch as the construction hereinbefore described and shown is the cheapest and easiest, I prefer it.

Having thus described my invention, what I claim as new is—

The perforated plug B, provided with grooves $i$, and operating in suitable bearings at each end, in combination with the valves $t$, each having a projection, $n$, and the shell A, whereby the said valves are forced firmly against their seats by the rotary movement of the plug, substantially as described.

DUANE T. PERKINS.

Witnesses:
T. A. CURTIS,
G. H. BLANDEN.